United States Patent
Kopchick et al.

(10) Patent No.: US 8,763,247 B2
(45) Date of Patent: Jul. 1, 2014

(54) DIESEL PISTON WITH BI-METALLIC DOME

(75) Inventors: Joseph C. Kopchick, Warren, MI (US); Mark A. Osborne, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 13/110,947

(22) Filed: May 19, 2011

(65) Prior Publication Data

US 2012/0085228 A1    Apr. 12, 2012

Related U.S. Application Data

(60) Provisional application No. 61/390,373, filed on Oct. 6, 2010.

(51) Int. Cl.
*B23P 11/00*        (2006.01)

(52) U.S. Cl.
USPC ................................ 29/888.047; 29/888.044

(58) Field of Classification Search
CPC ...... B22D 19/0027; B23P 15/10; B21K 1/18; B25B 27/12; F05C 2201/021; F05C 2201/0448
USPC ......... 29/888.04, 888.044, 888.047, 888.048, 29/888.049
See application file for complete search history.

(56) References Cited

U.S. PATENT DOCUMENTS

| | | | |
|---|---|---|---|
| 4,098,514 A | 7/1978 | Guenther | |
| 4,120,081 A * | 10/1978 | Rosch et al. | 29/888.045 |
| 4,546,048 A | 10/1985 | Guenther | |
| 4,754,798 A | 7/1988 | Chandley et al. | |
| 6,131,552 A | 10/2000 | Paielli et al. | |
| 6,412,479 B1 | 7/2002 | Canfield et al. | |
| 6,477,941 B1 | 11/2002 | Zhu et al. | |
| 6,513,477 B1 | 2/2003 | Gaiser et al. | |
| 6,651,549 B2 | 11/2003 | Zhu et al. | |
| 7,121,318 B2 | 10/2006 | Grassi et al. | |
| 7,164,963 B2 | 1/2007 | Caulk | |
| 2002/0189442 A1 | 12/2002 | Zhu et al. | |
| 2005/0178521 A1 | 8/2005 | Grassi et al. | |
| 2005/0199365 A1 * | 9/2005 | Pfeifer et al. | 164/132 |
| 2006/0086326 A1 * | 4/2006 | Rasmussen | 123/41.35 |
| 2009/0025674 A1 * | 1/2009 | Leitl | 123/193.6 |

FOREIGN PATENT DOCUMENTS

| | | |
|---|---|---|
| CH | 379065 A | 6/1964 |
| CN | 1041299 A | 4/1990 |
| DE | 3831400 A1 | 3/1989 |
| DE | 29823552 U1 | 3/1998 |
| DE | 102004033053 A1 | 1/2006 |
| DE | 102007029307 A1 | 12/2008 |
| DE | 102008004029 B3 | 9/2009 |
| GB | 1549220 | 7/1979 |
| JP | 62-240460 | 10/1987 |
| WO | 2009000420 A1 | 12/2008 |

* cited by examiner

*Primary Examiner* — Ryan J Walters
(74) *Attorney, Agent, or Firm* — Dinsmore & Shohl LLP

(57) ABSTRACT

A diesel piston with a cast bi-metallic dome and a method of making the piston. In one form, the dome may include a laminate of a relatively high-temperature material, for example, stainless steel, and a relatively low temperature material, for example, aluminum or aluminum alloys, such that the portion of the dome made from the relatively high-temperature material is directly exposed to combustion within a cylinder into which the piston is placed. In another form, an aluminum coated stainless steel ring is used to form the dome. In one form, an ablation casting process may be used to manufacture the dome.

11 Claims, 3 Drawing Sheets

DIESEL PISTON WITH BI-METALLIC DOME

STATEMENT OF RELATED CASES

This application claims the benefit of Provisional Application Ser. No. 61/390,373, filed Oct. 6, 2010, entitled Diesel Piston With Bi-Metallic Dome, which is incorporated herein by reference.

BACKGROUND OF THE INVENTION

The present invention relates generally to devices and methods for casting of engine components, and more particularly to an advanced bi-metallic piston and a way to manufacture the same.

Pistons used in internal combustion engines are typically made up of a head (also called a dome), skirts, one or more ring grooves, and lands between the grooves. While they are subjected to high combustion temperatures and pressures during engine operation, increasingly stringent emissions and efficiency requirements dictate that pistons of the future will need to be designed to withstand even more demanding operating conditions. This in turn will necessitate the use of higher-temperature capable materials and damage-resistant designs. This is especially true for pistons used in diesel engines that, in addition to being the predominant engine form for larger, commercial vehicles, are increasingly being used to power passenger vehicles.

While all of the various piston components mentioned above are expected to be subjected to additional loads as more power is extracted from smaller structures, it is the dome which, by virtue of being directly exposed to the combustion process, can be expected to be particularly vulnerable to thermo-mechanical damage. Unfortunately, light alloys typically used for pistons tend to have limited mechanical and temperature capability. For example, while aluminum alloys have conventionally been used for weight reduction in diesel engine pistons, their limited thermal and mechanical durability makes them incompatible with the higher temperature requirements of a more complete (and therefore higher temperature) combustion process. Steel pistons have the capability to endure the extreme environment; however, they are heavier than aluminum pistons. This weight problem is exacerbated by the high rate of speed and acceleration associated with piston movement, meaning that ancillary structures may additionally have to be fortified, with an even more detrimental weight impact.

Attempts have been made to combine the heat resistance of high temperature-capable materials with the lower weight of aluminum-based materials in diesel pistons. However, although composite pistons may satisfy the above objectives, the difficulties associated with their manufacture have offset many of their benefits. This is especially so because pistons have long been made as cast parts with some post-casting machining or related modifications. As such, it has been difficult to combine the inherent low-cost approach of casting with the flexibility of tailored material placement in the piston.

Currently, the piston is cast with the riser at one side of the dome, which results in property variation around the dome. The casting method may be changed to feed the piston so that the riser is in a more typical location, such as at the center of the dome. In another alternative, the bowl rim can be re-melted using TIG or lasers. While this may achieve a particularly well-refined microstructure in the dome region of interest, there is no insulation benefit from the heat of combustion.

SUMMARY OF THE INVENTION

One aspect of the invention is a method of making a diesel piston. In one embodiment, the method includes providing a pattern for the piston including a dome; forming a piston mold around the pattern, the mold comprising an aggregate material and a binder; removing the pattern from the piston mold; placing a bimetallic ring in the piston mold at an upper surface of the dome; introducing molten metal into the piston mold with the bimetallic ring; contacting the piston mold with a solvent for the binder and removing the binder and the aggregate; cooling the molten metal; and solidifying the molten metal to form the piston, the bimetallic ring forming at least a portion of the upper surface of the dome.

Another aspect of the invention is a diesel piston. In one embodiment, the diesel piston includes a body and a dome, at least a portion of an upper surface of the dome comprising a bimetallic ring, the bimetallic ring comprising a first layer of aluminum or aluminum alloy and a second layer of stainless steel, and wherein the second layer forms at least the portion of the upper surface of the dome, the first layer being bonded with the body, the body comprising aluminum or aluminum alloy.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

An ablation casting approach can be used to produce a piston with an as-cast dome incorporating a laminated material. The use of ablation casting offers the possibility of casting the piston with a near-net-shape dome without the significant machining required of other casting processes. In this way, a bi-metallic as-cast surface may be placed across at least portions of the piston dome. In one form, the portion may include the flat region from the piston outside circumference to the bowl rim. This could be beneficial in that by limiting application of the laminate to only flat shelf of the dome, it reinforces regions that are prone to high thermal stresses and offers some insulation benefits, while keeping weight increases to a minimum.

In one form, a more high temperature tolerant stainless steel layer may be used as one of the laminate layers, while an aluminum-based material may serve as another. In addition to enhanced resistance to thermal load relative to the aluminum, the stainless steel will provide a measure of stiffness to the dome, and due to its lower thermal conductivity relative to the underlying aluminum, it will act as a thermal barrier to prevent thermal fatigue cracks from forming at the bowl rim. The stainless steel material may also provide some measure of insulation of the ring grooves from combustion heat.

In a particular form, the laminate is configured as a dome insert. Using a cast-in insert eliminates the need for laser or tungsten inert gas (TIG) remelting that is typically employed to achieve very localized refinement.

In another form, a casting method can be used to create the bowl itself. In one form, the mold can be made from sand that is capable of ablation casting such that complex dome shapes, including those with reentrant features, may be easily and inexpensively manufactured.

Figure 1:
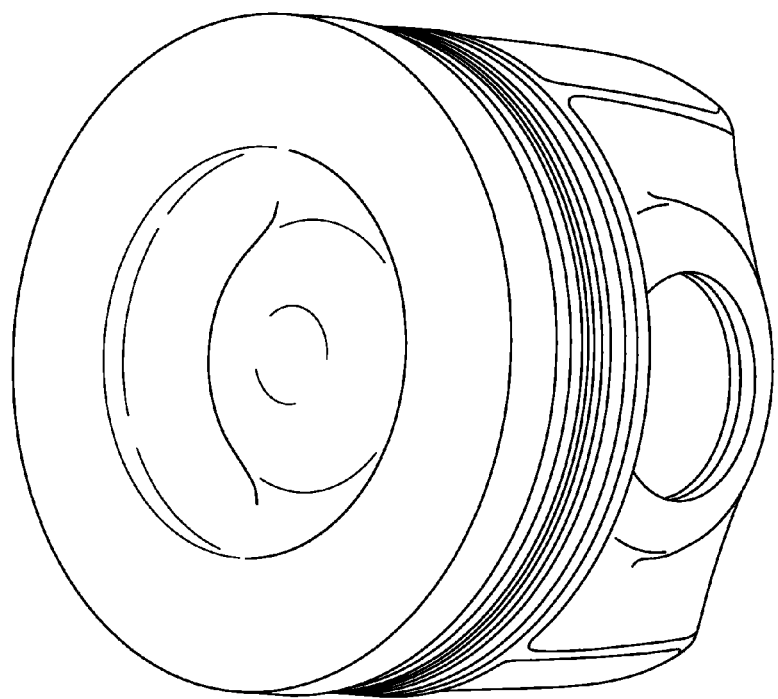
FIG. 1 is top perspective view of a diesel piston with a conventional metallic dome according to the prior art.
Figure 2:
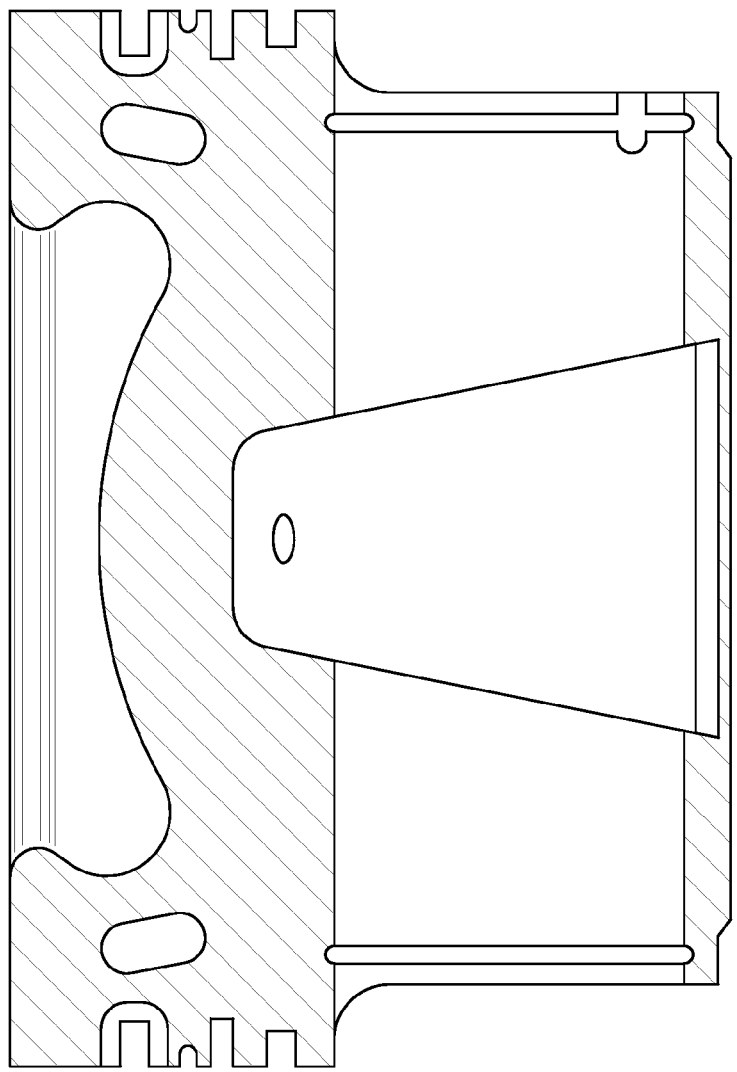
FIG. 2 is a cutaway view of the diesel piston of FIG. 1.

Referring first to FIGS. 1 and 2, the alloys used for the domes of conventional diesel pistons may be prone to early failure, especially in locations where temperature regimes and manufacturing limitations may not be sufficient. Current pistons are subject to cracking due to heat and microstructural variation, among other things.

Figure 3:
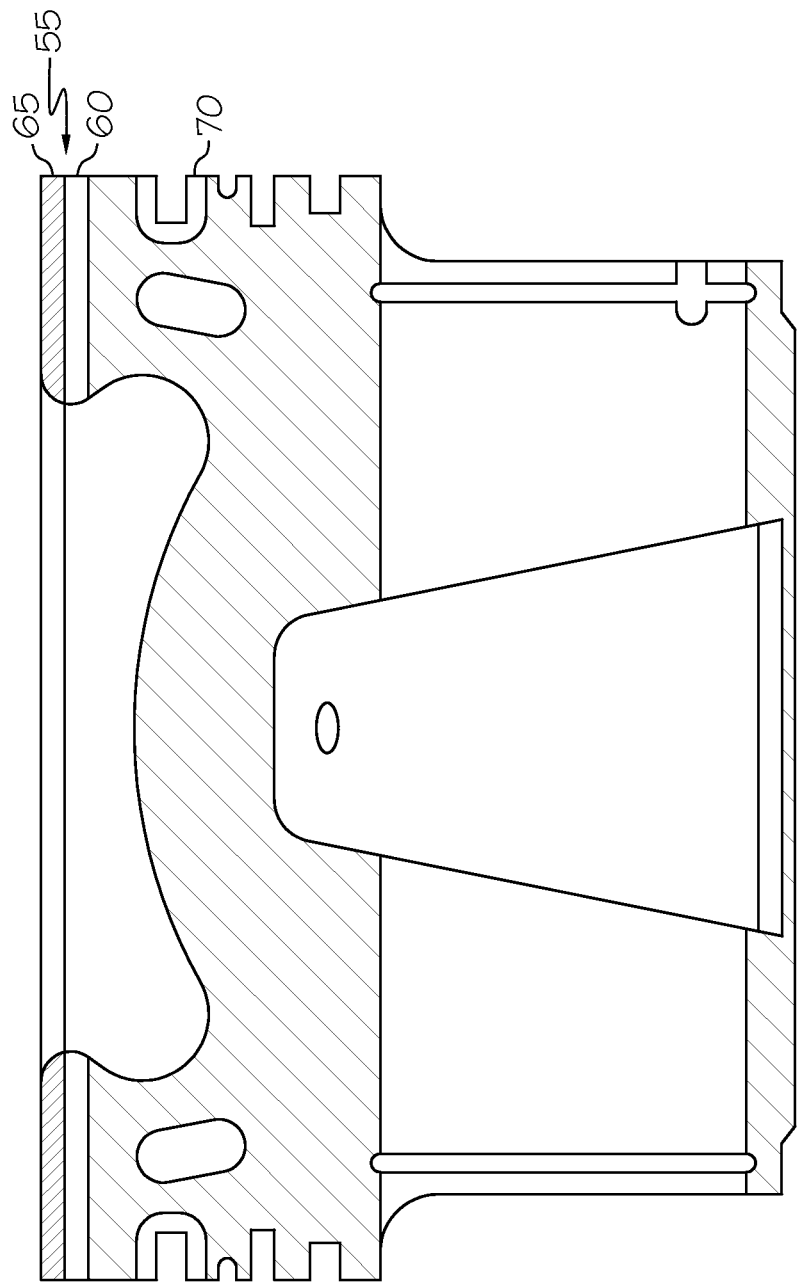
FIG. 3 shows a cutaway view of a piston according to an aspect of the present invention with at least a flat part of the dome being made of a bi-metallic material.

Referring next to FIG. 3, a diesel piston 70 according to one aspect of the present invention is shown. In this design, the upper surface of the dome in general, and the generally planar outer periphery in particular, may include a bi-metallic ring 55. In one embodiment, the bimetallic ring 55 is a laminate including a lower layer 60 of aluminum or aluminum alloy, and an upper layer 65 of a more heat resistant material, such as a stainless steel. The total thickness of the bi-metallic laminate would be about 4 to about 6 mm, with the aluminum portion being about 10-20% of the total thickness. The laminate ring could be made by stamping. In another embodiment, a stainless steel ring (about 4 to about 6 mm thick) could be coated with a thin layer of aluminum (e.g., less than about 100 microns, or between about 25 and about 50 microns).

The laminate 55 may be cast with the remainder of the piston 70 by placing the laminate 55 in the sand mold as an insert. One side 60 of the laminate insert 55 will be a low melting point aluminum alloy which will metallurgically bond to the piston alloy being used. The laminate thickness will be sufficient to ensure that the stainless steel material 65 encompasses the bowl rim. Optionally, some minor edge machining may take place to provide a more rounded edge for stress concentration reduction. The stainless steel layer 65 will not only provide a thermal benefit as discussed above, its surface finish should also be very good, which additionally minimizes the presence of stress concentrators.

Using the ablation casting process should result in a much finer microstructure throughout, with resulting enhanced piston properties. For example, the faster cooling associated with ablation casting leads to finer microstructures and better mechanical properties (as evidenced by smaller secondary dendrite arm spacing (SDAS)).

An ablation casting approach can be used to produce a piston with a dome incorporating an as-cast, undercut combustion bowl, and an optional internal cooling passage. Ablation uses inorganic (i.e., water soluble) cores, and water is sprayed on the mold which slowly washes away (hence the term "ablation"), rapidly cooling the casting. The rapid cooling results in improved material properties. Ablation casting allows complex parts to be produced with fine solidification microstructure. The application of water allows component solidification and cooling to be controlled separately from one another (e.g., by applying water to specific areas of the casting before others or by applying different amounts of water to different areas). By providing the high solidification rates and refined microstructure that are often needed to achieve the through-section higher mechanical properties (such as tensile and fatigue properties at room temperature and elevated temperatures), ablation casting allows complex parts to be formed, such as those combining both thin and thick sections, as well as those with complex internal cores. The through-section properties are superior compared to those made using bowl rim re-melting, which only provides the desirable fine microstructure to a depth only slightly below the surface (e.g., a few mm).

The ablation casting process is described generally in U.S. Pat. No. 7,121,318, which is incorporated by reference herein. A pattern is formed from a material, and a mold is formed around at least a portion of the pattern. The mold is made of aggregate material and a binder. The pattern is removed from the mold, and molten metal is then introduced into the mold. The mold is contacted with a solvent, and the molten metal is cooled so that it at least partially solidifies to form a casting. The cooling step includes contacting a shell of solidified metal around the molten metal with the solvent.

Ablation casting has not been used to cast diesel pistons in general, and more particularly diesel pistons with undercut combustion bowl.

U.S. Pat. Nos. 7,164,963, 7,618,823, and 7,225,049 describe analysis methods for lost foam casting (a type of ablation casting), each of which is incorporated by reference herein.

The use of ablation casting offers the possibility of casting the piston with a near-net-shape dome without the significant machining required by other processes. Thus, the dome and combustion bowl can be cast simultaneously. In a particular form, the undercut bowl and internal passages would be produced by means of an aggregate disposable mold that could be produced by conventional core technology with retractable tooling in the molding die. In the present context, the aggregate form of the molding media includes, but is not limited to, silica sand, zircon sand, chromite sand, ceramic micro spheres, or the like.

Among the benefits associated with the present invention are reduced machining costs, refined as-cast microstructure for improved mechanical properties, taking advantage of a sand (or related) molding process to tailor an undercut region in the dome, reducing casting weight, and eliminating the need for an internal salt core. The traditional salt core could be replaced with an aggregate core of the same material as the piston mold.

In one form, sand casting can be used to produce the piston of the present invention. This process would substantially reduce the massive risers that are typically used with permanent mold casting, resulting in improved material yield. Furthermore, the high cooling rate inherent in ablation casting makes it easier to tailor the process to achieve a refined microstructure with improved material properties. These improved material properties should provide a stronger piston as a whole, as well as the needed piston bowl rim strength (without having to re-melt this area) to pass rigorous head gasket validation tests consistently.

In one particular form, the mold can be made from sand that is capable of ablation casting such that complex dome shapes, including those with undercut and internal cooling passage features, may be easily and inexpensively manufactured. As such, a sand mold may be used as part of the ablation process.

Improved material yield can be realized by eliminating the large risers that are often used as part of a permanent mold casting operation. In particular, by using an ablation casting approach, the inherently high cooling rate can allow the piston being formed to have a homogeneous microstructure and related structural properties.

In addition to the finer microstructure and enhanced piston properties, use of the ablation process permits much finer details to be cast into the part, including intricate cooling channels. The process reduces or eliminates the need for post-cast machining in the area around the dome, particularly as it relates to the undercut region. Because the ablation casting is production-ready, scaling up to manufacture large quantities of pistons or related components is comparatively simple. An aggregate disposable mold could be employed to allow the combustion bowl of the piston dome and a lubricating and cooling oil gallery to be formed as part of the casting.

Employing ablation casting for diesel pistons helps to achieve a significant microstructural refinement by reducing or eliminating the need for expensive secondary processing such as machining or remelting. In situations where a refined microstructure is desired, such as the bowl edge or other complex 3D regions of the piston, tungsten inert gas (TIG) or laser remelting can be done locally (in the dome undercut region). Subsequent machining, such as to yield proper shape of the bowl edge, may be similarly reduced or eliminated.

This invention takes advantage of the ablation casting process to eliminate the need for large risers at the piston dome. The ability to cool the dome more quickly and uniformly should enhance mechanical properties. In particular, the disposable aggregate mold should allow the combustion bowl to be formed as-cast. Furthermore, the aggregate mold material may also be used to form the oil gallery behind the top ring groove, eliminating the need for a salt core. This additionally allows for rapid prototyping of pistons, which can improve general development testing.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While certain representative embodiments and details have been shown for purposes of illustrating the invention, it will be apparent to those skilled in the art that various changes may be made without departing from the scope of the invention, which is defined in the appended claims.

What is claimed is:

1. A method of making a diesel piston comprising:
   providing a pattern for the piston including a dome;
   forming a piston mold around the pattern, the mold comprising an aggregate material and a binder;
   removing the pattern from the piston mold;
   placing a bimetallic ring in the piston mold;
   introducing molten metal into the piston mold with the bimetallic ring;
   contacting the piston mold with a solvent for the binder and removing the binder and the aggregate material;
   cooling the molten metal; and
   solidifying the molten metal to form the piston, the bimetallic ring comprising a first layer of aluminum or aluminum alloy and a second layer of stainless steel, and wherein the second layer forms an upper surface of the dome and the first and second layers are applied only to a flat region of the dome from an outside circumference of the piston to a rim of a combustion bowl.

2. The method of claim 1 wherein the bimetallic ring is made by stamping.

3. The method of claim 1 wherein the pattern for the piston includes a reentrant combustion bowl.

4. The method of claim 1 wherein the binder is water soluble, and wherein the solvent is water.

5. The method of claim 1 wherein cooling and solidifying the molten metal are controlled separately.

6. The method of claim 1 wherein the aggregate material is silica sand, zircon sand, chromite sand, ceramic micro spheres, or combinations thereof.

7. The method of claim 1 wherein cooling the molten metal comprises contacting a shell of solidified metal around the molten metal with the solvent.

8. The method of claim 1 wherein contacting the piston mold with a solvent for the binder comprises spraying the piston mold with the solvent.

9. A method of making a diesel piston comprising:
   providing a pattern for the piston including a dome;
   forming a piston mold around the pattern, the mold comprising an aggregate material and a binder;
   removing the pattern from the piston mold;
   placing a bimetallic ring in the piston mold;
   introducing molten metal into the piston mold with the bimetallic ring;
   contacting the piston mold with water and removing the binder and the aggregate material;
   cooling the molten metal; and
   solidifying the molten metal to form the piston, the bimetallic ring comprising a first layer of aluminum or aluminum alloy and a second layer of stainless steel, and wherein the second layer forms an upper surface of the dome and the first and second layers are applied only to a flat region of the dome from an outside circumference of the piston to a rim of a combustion bowl.

10. The method of claim 9 wherein the bimetallic ring is made by stamping.

11. The method of claim 9 wherein the pattern for the piston includes an undercut combustion bowl.

* * * * *